United States Patent
Robinson (10) Patent No.: US 9,256,218 B2
(45) Date of Patent: Feb. 9, 2016

(54) CONTROL MECHANISM HAVING AN IMAGE DISPLAY AREA

(75) Inventor: Ian N Robinson, Pebble Beach, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2259 days.

(21) Appl. No.: 12/244,862

(22) Filed: Oct. 3, 2008

(65) Prior Publication Data

US 2009/0306795 A1    Dec. 10, 2009

Related U.S. Application Data

(60) Provisional application No. 61/059,750, filed on Jun. 6, 2008.

(51) Int. Cl.
*G06F 3/033* (2013.01)
*G05B 19/042* (2006.01)
*G06F 3/0362* (2013.01)

(52) U.S. Cl.
CPC .......... *G05B 19/0425* (2013.01); *G06F 3/0362* (2013.01); *G05B 2219/21009* (2013.01); *G05B 2219/2206* (2013.01); *G06F 3/033* (2013.01)

(58) Field of Classification Search
CPC ... G06F 3/0362; G06F 3/033; G05B 19/0425; G05B 2219/2206; G05B 2219/21009; G05B 15/00

USPC .................................................. 345/156–184
See application file for complete search history.

(56) References Cited

U.S. PATENT DOCUMENTS

| | | | |
|---|---|---|---|
| 5,572,239 A * | 11/1996 | Jaeger ........................... | 345/172 |
| 5,805,146 A * | 9/1998 | Jaeger et al. .................. | 345/172 |
| 6,426,738 B1 * | 7/2002 | Furuya et al. ................. | 345/156 |
| 6,642,919 B1 * | 11/2003 | Jaeger et al. .................. | 345/161 |
| 2006/0071918 A1 * | 4/2006 | Mori et al. .................... | 345/184 |
| 2007/0097108 A1 * | 5/2007 | Brewer ......................... | 345/204 |

OTHER PUBLICATIONS http://www.nkksmartswitch.com/products/hires.asp ; High Resolution SmartSwitch and SmartDisplay ; Jun. 13, 2008.
http://www.artlebedev.com/everything/optimus/; Optimus Maximus Keyboard, Jun. 13, 2008.

* cited by examiner

*Primary Examiner* — Jimmy H Nguyen
(74) *Attorney, Agent, or Firm* — Hewlett-Packard Patent Department (57) ABSTRACT

A control mechanism includes a housing that is moveable from a first position to a second position. The housing includes a display area. The movement of the housing from the first position to the second position is detected. A first image is displayed on a display screen responsive to detection of the movement of the housing from the first position to the second position. At least a portion of the first image is optically transmitted from the display screen to the display area via an optical coupling system for display in the display area of the housing.

22 Claims, 5 Drawing Sheets

CONTROL MECHANISM HAVING AN IMAGE DISPLAY AREA

CROSS-REFERENCE TO RELATED APPLICATIONS

The present application claims priority from provisional application Ser. No. 61/059,750, filed Jun. 6, 2008, the contents of which are incorporated herein by reference in their entirety.

FIELD OF THE INVENTION

The present invention generally relates to a control mechanism and more particularly to a control mechanism having an image display area.

BACKGROUND OF THE INVENTION

Hardware control mechanisms, such as for example, including but not limited to control knobs and control buttons are routinely used as input mechanisms for providing input data to different types of systems and to enable user interaction with said systems. Moving hardware controls typically provide valuable tactile feedback to the user. When a user wishes to provide an input to a system, the user typically manipulates the position of the associated hardware control mechanism to provide a desired input to the system. For example, a user may rotate a control knob to provide a desire input. In another example, a hardware control mechanism may include a plurality of control push buttons where each individual button is associated with a different input and a user selectively actuates the control button associated with the input that the user wishes to provide to the system.

As system complexities and capabilities increase, mechanisms for providing complex visual feedback at or near the control mechanism may be desirable. Examples of such visual feedback mechanisms include, but are not limited to, task icons, mode dependent menus or level controls and animated graphic schematics of the system operation affected by the control mechanism.

SUMMARY OF THE INVENTION

On aspect of the invention is directed to a control mechanism having an image display area. The control mechanism includes a housing, an input sensor, a display screen and an optical coupling system. The housing includes a display area and is moveable from a first position to a second position. The input sensor is operable to detect movement of the housing and to be communicatively coupled to a controller. The display screen is operable to be communicatively coupled to the controller and to display a first image generated by the controller responsive to detection of movement of the housing from the first position to the second position by the input sensor. The optical coupling system is operable to optically couple an area of the display screen to the display area of the housing and to optically transmit at least a portion of the first image displayed on the display screen for display in the display area.

DETAILED DESCRIPTION OF THE DRAWINGS

Figure 1:
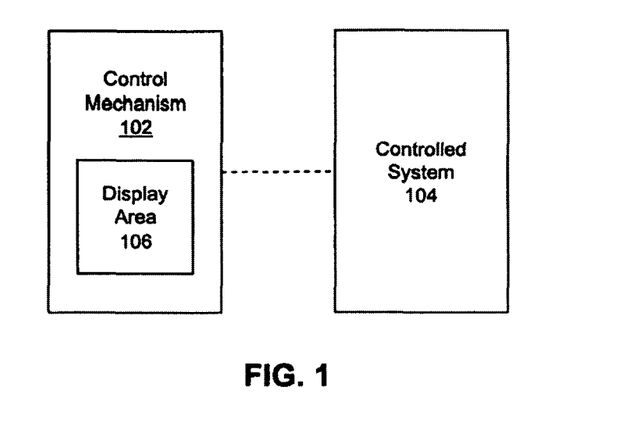
FIG. 1 is a block diagram representation of one embodiment of a control mechanism communicatively coupled to a controlled system.

Referring to FIG. 1, a block diagram representation of one embodiment of a control mechanism 102 communicatively coupled to a controlled system 104 is shown. The control mechanism 102 includes a display area 106. In one embodiment, the control mechanism 102 is a separate device and can be communicatively coupled to the controlled system 104. In one embodiment, the control mechanism 102 is an integral component of the controlled system 104. The control mechanism 102 operates as an input device to the controlled system 104 and is used to provide desired input data to the controlled system 104. In one embodiment, a user provides desired input data to the controlled system 104 via the control mechanism 102.

In one embodiment, the controlled system 104 generates one or more images for display in the display area 106 of the control mechanism 102. In one embodiment, the control mechanism 102 receives one or more initial images from the controlled system 104 for display in the display area 106 upon initialization of the controlled system 104. In one embodiment, the control mechanism 102 receives one or more images from the controlled system 104 for display in the display area 106 where the one or more images are generated by the controlled system 104 responsive to input data received at the controlled system 104. In one embodiment, the one or more images are generated by the controlled system 104 responsive to input data received at the controlled system 104 via the control mechanism 102.

In one embodiment, the control mechanism 102 generates the one or more images for display in the display area 106 responsive to an image generation command received from the controlled system 104. In one embodiment, the control mechanism 102 receives an image generation command from the controlled system 104 to generate one or more initial images for display in the display area 106 upon initialization of the controlled system 104. In one embodiment, the control mechanism 102 receives an image generation command to generate one or more images for display in the display area 106 where the image generation command is generated at the controlled system 104 responsive to input data received at the controlled system 104. In one embodiment, the control mechanism 102 receives an image generation command to generate the one or more images where the image generation command is generated at the controlled system 104 responsive to input data received at the controlled system 104 via the control mechanism 102. In one embodiment, the control mechanism 102 receives an image generation command from the controlled system 104 to generate the one or more images where the one or more images reflect the more recent input data received at the controlled system 104 via the control mechanism 102.

In one embodiment, the one or more images reflect the more recent input data received at the controlled system 104 via the control mechanism 102. In one embodiment, the one or more images reflect the status of the controlled system 104. In one embodiment, the one or more images reflect the status of the controlled system 104 response to input data received via the control mechanism 102. In one embodiment, the one or more images reflect the status of the controlled system 104 with respect to the controlled system parameter controlled by the control mechanism 102.

Figure 2:
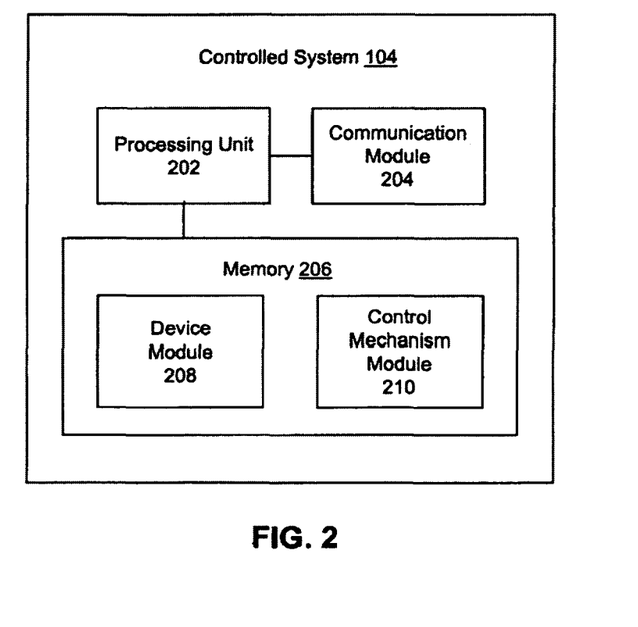
FIG. 2 is a block diagram representation of a controlled system that may be used with one embodiment of a control mechanism.

Referring to FIG. 2, a block diagram representation of a controlled system 104 that may be used with one embodiment of a control mechanism 102 is shown. The controlled system 104 includes a processing unit 202 communicatively coupled to a communication module 204 and a memory 206. In one embodiment, a device module 208 and a control mechanism module 210 are stored in the memory 206. In one embodiment, a device module is stored in the memory 206 and a control mechanism module 210 is stored in the control mechanism 102. The device module 208 generally controls operation of the controlled system 104. In one embodiment the control mechanism module 210 receives input data provided via the control mechanism 102 and provides the received input data to the device module 208 for processing. In one embodiment, the control mechanism module 210 receives an image generation command from the device module 208 and responsively generates one or more images for display in the display area 106 of the control mechanism 102. While two different modules have been described, the memory 206 may include additional modules that facilitate the operation of the controlled system 104 and/or control mechanism 102.

The processing unit 202 generally includes a processor or controller. In one embodiment, the communication module 204 coordinates the exchange of data between the controlled system 104 and other systems. In one embodiment, the communication module 204 coordinates the exchange of data between the controlled system 104 and the control mechanism 102. In one embodiment, the communication module 204 supports wired communication. In one embodiment, the communication module 204 supports wireless communication. In one embodiment, the communication module 204 supports short range wireless communication. In one embodiment, the communication module 204 supports Bluetooth communication.

In one embodiment, the memory 206 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 202 generally retrieves and executes machine readable instructions or software programs that are stored in the memory 206.

Figure 3:
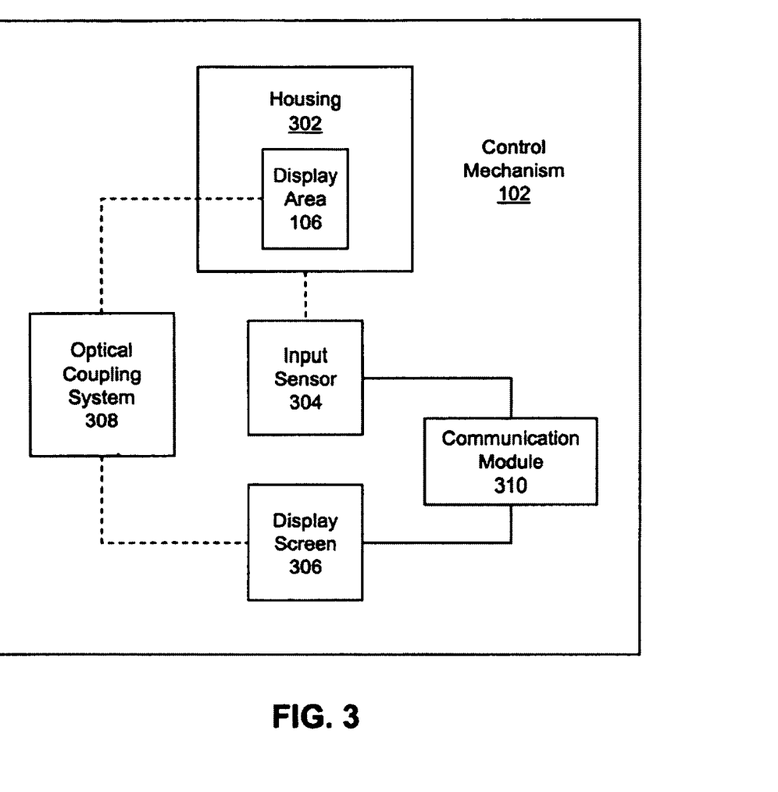
FIG. 3 is a block diagram representation of one embodiment of a control mechanism.

Referring to FIG. 3, one embodiment of a control mechanism 102 is shown. The control mechanism 102 includes a housing 302, an input sensor 304, a display screen 306, an optical coupling system 308 and a communication module 310. The housing 302 includes a display area 106. In one embodiment, the display area 106 is a generally translucent.

In one embodiment, the display area 106 is generally transparent. The input sensor 304 and the display screen 306 are operable to be communicatively coupled to the controller 202 in the controlled system 104. In one embodiment the controlled mechanism 102 is communicatively coupled to the controlled system 104 via the communication module 310. The communication module 310 enables the exchange of data between the control mechanism 102 and the controlled system 104. In one embodiment, the communication module 310 supports wired communication. In one embodiment, the communication module 310 supports wireless communication. In one embodiment, the communication module 310 supports short range wireless communication. In one embodiment, the communication module 310 supports Bluetooth communication.

In one embodiment, the display screen 306 is an electroluminescent display screen. In one embodiment the display screen 306 is a light emitting diode (LED) screen. In one embodiment, the display screen 306 is an organic light emitting diode (OLED) screen. While a number of different types of display screen 306 have been described alternative types of display screens may also be used. In one embodiment, the display screen 306 is maintained in a fixed position and the housing movement is independent of the fixed position of the display screen 306.

The input sensor 304 detects the movement of the housing 302. In one embodiment, the sensed housing movement is a sensed rate of movement of the housing 302. The detected movement is transmitted to the controlled system 104 for processing. In one embodiment, the input sensor 304 is a pressure sensor. In one embodiment, the input sensor 304 is an optical sensor. In one embodiment, the input sensor 304 is a magnetic sensor. In one embodiment, the input sensor 304 is a position encoder.

In one embodiment, the display area 106 is a portion of the outer surface of the housing 302. In one embodiment, the display area 106 is an entire outer surface of the housing 302. In one embodiment, the display area 106 is a portion of an upper surface of the housing 302. In one embodiment, the display area 106 is an entire upper surface of the housing 302. In one embodiment, the display screen 306 has a first shape and the display area 106 has a second shape where the first shape is different from the second shape. For example, the display screen 306 may have a generally rectangular shape while the display area 106 has a generally circular shape. In one embodiment, the display screen 306 has a first size and the display area 106 has a second size where the first size is different from the second size.

In one embodiment, the optical coupling system 308 transmits an entire image displayed on the display screen 306 to the display area 106. In one embodiment, the optical coupling system transmits a portion of an image displayed on the display screen 306 to the display area 106. In one embodiment, the optical coupling system 308 optically couples at least a portion of the display screen 306 to the display area 106. In one embodiment, the optical coupling system 308 optically couples the entire area of the display screen 306 to the display area 106. In one embodiment, the optical coupling system 308 optically couples an area of a display screen 306 having a first shape to a display area 106 having a second shape where the first shape is different than the second shape.

In one embodiment, the display screen 306 displays one or more images on the display screen 306 in a display orientation. The optical coupling system 308 optically transmits at least a portion of the one or more images from the display screen 306 to the display area 106 for display in the display area 106 in the display orientation.

In one embodiment, the optical coupling system 308 is a rear projection system. In one embodiment, the optical coupling system 308 is a fiber optic system. In one embodiment, the optical coupling system 308 is a material composed of parallel packed optical fibers. While a number of different types of optical coupling systems 308 have been described alternative types of optical coupling systems 308 may be used to transmit at least a portion of an image displayed on an area of a display screen 306 to a display area 106 of a housing 302.

In one embodiment, the housing 302 is manufactured using a fiber optic material and operates as the optical coupling system 308. At least a portion of the surface of the housing 302 operates as the display area 106. Such a housing 302 is positioned adjacent to the display screen 306 such that at least a portion of an image displayed on the display screen 306 is piped to the display area 106 portion of the housing 302. In one embodiment, one or more images are displayed on the display screen 306 in a first orientation. At least a portion of the one or more images is displayed in the display area 106 in the first orientation.

The housing 302 is moveable between one or more different housing positions. In one embodiment, the housing 302 is moveable independent of and relative to the display screen 306. In one embodiment, the housing 302 is moveable independent of and relative to the optical coupling system 308. Each of the one or more different housing positions is associated with specific input data. In one embodiment, when a user wishes to provide selected input data to the controlled system 104 via the control mechanism 102, the user moves the housing 302 to a housing position associated with the selected input data. In one embodiment, the housing 302 is biased towards an initial position so upon releasing the housing 302 following the selective movement of the housing 302 to a position associated with the desired input data, the housing 302 automatically returns to the initial position.

The input sensor 304 senses the movement of the housing 302 and communicates the sensed housing movement to the controlled mechanism 104 via the communication module 310. In one embodiment, the sensed housing movement is a sensed rate of movement of the housing 302. The controlled mechanism 104 receives the housing movement detected by the input sensor 304 and determines whether the housing movement data is associated with specific input data and responsively generates an image generation command to generate one or more images associated with the determined input data for display on the display screen 306.

In one embodiment, the controlled system 104 generates the one or more images responsive to the image generation command and transmits the generated one or more images to the control mechanism 102 for display on the display screen 306. In one embodiment, the controlled system 104 transmits the image generation command to the control mechanism 102 and the control mechanism 102 responsively generates the one or more images for display on the display screen 306. The optical coupling system 308 transmits at least a portion of the one or more images displayed on the display screen 306 for display in the display area of the housing 302. In one embodiment, at least a portion of the one or more images displayed in the display area 106 has generally the same orientation as the one or more images displayed on the display screen 306.

In one embodiment, the housing 302 is moveable from a reference position to one or more different positions relative to the reference position where the relative movement of the housing 302 defines the input data selected by the user. The current position of the housing 302 is defined as the reference position. In one embodiment, the reference position is the initial position that the housing 302 was placed in during or immediately prior to initialization of the controlled system 104. In one embodiment, the reference position changes every time the user selectively moves the relative position of the housing 302 to provide selected input data to the controlled system 104. More specifically, the position of the housing 302 associated with providing selected input data becomes the reference position for the next time the user selectively moves the position of the housing 302 to provided input data to the controlled system 104. When the user wishes to provide desired input data, the user moves the housing from the reference position to a relative position associated with the desired input data. The input sensor 304 senses the relative movement of the housing 302 from the reference position to the selected relative position and the detected relative housing movement data is transmitted from the control mechanism 102 to the controlled system 104 for processing.

Figure 4:
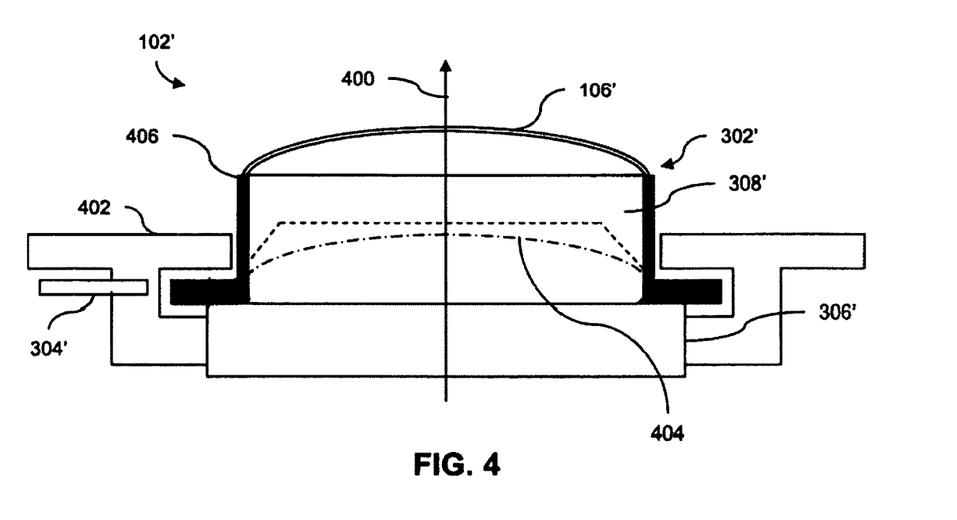
FIG. 4 is an illustration of a perspective view of a cross section of one example of one embodiment of a control mechanism.

Referring to FIG. 4 an illustration of a perspective view of a cross section of one example of one embodiment of a control mechanism 102' is shown. The control mechanism 102' includes a knob shaped housing 302' that surrounds an optical coupling system 308' in the form of a cylindrical piece of stacked fiber optic material. The fiber optic material consists of a plurality of optical fibers stacked vertically in the direction of a rotation axis 400. The knob shaped housing 302' is rotatable about the rotation axis 400 with respect to a housing enclosure 402. The upper surface area of the control mechanism 102' operates as the display area 106'.

The control mechanism 102' includes a generally rectangular shaped display screen 306'. The optical coupling system 308' optically couples a portion of the display screen 306' to the display area 106'. The optical coupling system 308's optically couples a display screen area 404 that is approximately equal to the circular area to the display area 106'. The image displayed in the display area 106' generally has the same display orientation as that of the image displayed on the display screen 306'.

A user provides desired input data to the controlled system 104 by rotating the knob shaped housing 302'. In one embodiment, the display can show a position marker, along with markings that appear to remain static with respect to the knob's enclosure. The input sensor 304' is a position encoder that operates to detect the movement of the knob shaped housing 302'. The detected housing movement data is transmitted to the controlled system 104. An image generated by the controlled system 104 is displayed on the display screen 306'. The optical coupling system 308' pipes the portion of the displayed image within the circular area 404 of the display screen 306' for display in the display area 106'.

In one embodiment, the relative rotation of the knob shaped housing 302' with respect to a reference position defines the input data selected by a user. When the user wishes to provide desired input data, the user moves the housing from the reference position to a relative position associated with the desired input data. The input sensor 304 senses the relative movement of the knob shaped housing 302 from the reference position to the relative position and the detected relative housing movement data is transmitted from the control mechanism 102 to the controlled system 104 for processing. In one embodiment, the input sensor 304' detects a rate of rotational movement of the knob shaped housing 302' where the rate of rotational movement of the knob shaped housing 302' defines the input data entered by the user.

Figure 5:
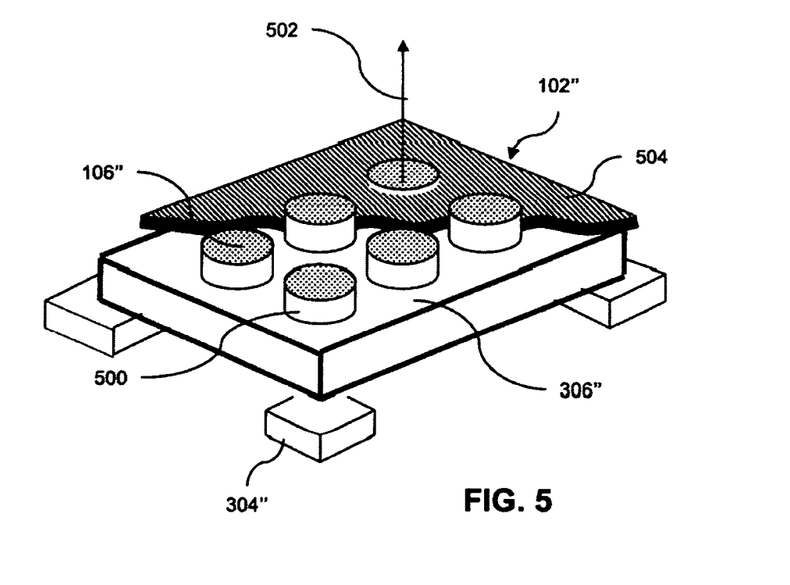
FIG. 5 is an illustration of a perspective view of one example of one embodiment of a control mechanism with a partially cutaway enclosure.

Referring to FIG. 5, an illustration of a perspective view of one example of one embodiment of a control mechanism 102" with a partially cutaway enclosure 504 is shown. The control mechanism 102" includes a display screen 306" with a plurality of push buttons 500 disposed on the surface of the display screen 306". The push buttons are retained within openings in an enclosure 504 that covers the display screen 306". The push buttons 500 are manufactured using a vertically stacked fiber optic material and operates as both a control mechanism housing 302" and as an optical coupling system 308". The upper surface of each push button 500 operates as the display area 106" for that push button 500. Each individual push button 500 operating as the optical coupling system 308" for that push button 500 pipes the portion of an image displayed on the display screen 306" adjacent to the lower surface of that push button to the display area 106" defined by the upper surface of the push button 500. The portion of the image displayed in the display area 106" has generally the same orientation as the orientation of the image displayed on the display screen 306".

Each push button 500 is associated with specific input data and can be depressed along a vertical axis 502. A user selects desired input data by pushing down the associated push button 500. In one embodiment, each push button is biased towards an initial unpushed position. The control mechanism 102" includes four input sensors 304" where an input sensor 304" is disposed below each corner of the display screen 306". The input sensors 304" are pressure sensors.

When a user wishes to enter desired input data, the user depresses the push button 500 (operating as the control mechanism housing 302") associated with desired input data along the vertical axis 502. The input sensors 304 detect the movement of the display screen 306" responsive to the movement of the push button 500 selected by the user. In other words, each of the four pressure sensors senses the movement of the selected push button housing 500 by sensing the pressure on the display screen 306" resulting from the pushing down of the selected push button 500. The sensed push button housing related movement data is transmitted from the control mechanism 102" to the controlled system 104 for processing. More specifically, the pressure sensed by each of the four input sensors 304" is transmitted to the controlled system for processing.

The controlled system 104 analyzes the received sensed pressure data to determine which one of the plurality of push buttons 500 was depressed by the user and generates an image generation command to display one or more images associated with the input data on the display screen 306". Each push button housing 500 pipes the portion of the one or more images displayed on the display screen 306" adjacent the lower surface of that push button 500 for display in the display area 106" defined by the upper surface of that push button 500.

In one embodiment, the control mechanism 102 is moveable on a planar surface. In one embodiment, the relative movement of the control mechanism 102 on the planar surface defines the specific input data. In one embodiment, the position of the control mechanism 102 on the planar surface defines the input data. In one embodiment, the control mechanism 102 includes a housing 302 having an extension coupled to a groove having a length along a sliding axis. The housing 302 is moveable within the groove along the sliding axis. In one embodiment, the position of the housing 302 along the sliding axis within the groove defines the specific input data being supplied by the control mechanism 102. While a number of different control mechanisms have been described, alternative types of control mechanisms may be used.

Figure 6:
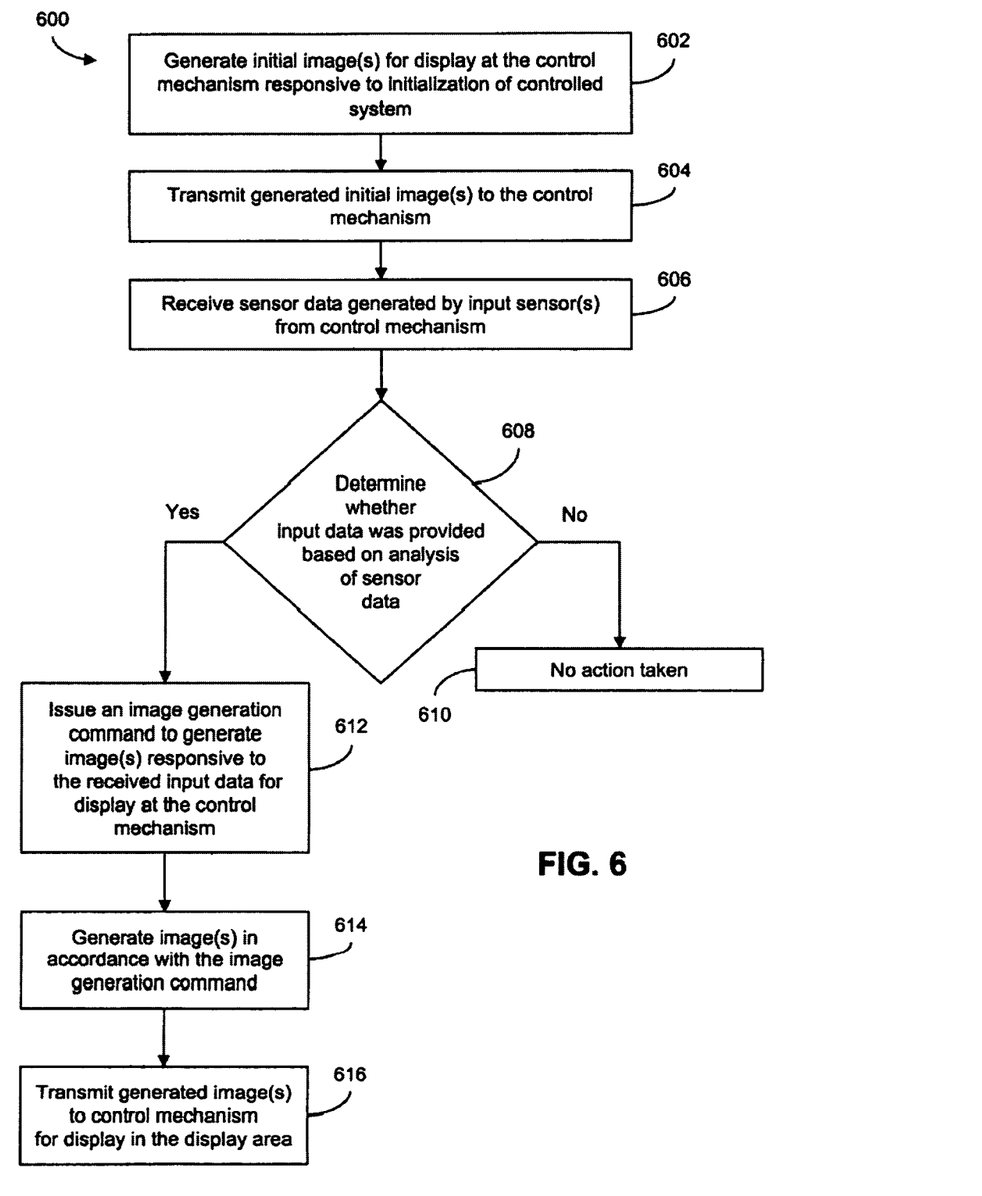
FIG. 6 is a flowchart representation of one embodiment of a method of generating images for in the display area of a control mechanism.

Referring to FIG. 6 a flowchart representation of one embodiment of a method of generating images for display in the display area of a control mechanism 102 is shown. An initial image(s) is generated by the controlled system 104 for display in the control mechanism 102 responsive to initialization of the controlled system 104 at step 602. In one embodiment, the controlled system 104 is initialized upon power up. The initial image(s) is transmitted from the controlled system 104 to the control mechanism 102 for display in the display area 106 at step 604. In one embodiment, the initial image(s) displayed in the display area 106 reflects the initial status of the controlled system 104. In one embodiment, the initial image(s) displayed in the display area 106 reflects the initial status of the controlled system 104 with respect to a parameter controlled by the control mechanism 102.

When a user wishes to provide input data to the controlled system 104, the user manipulates the position of the housing 302 to provide the desired input data. The input sensor(s) 304 at the control mechanism 102 sense the movement of the housing 302 and transmits the detected sensor data to the controlled system 104. The sensor data generated by the input sensor(s) 304 is received at the controlled system 104 at step 606.

In one embodiment, different pre-defined sensor data thresholds correlate to different input data. A determination is made regarding whether the received sensor data exceeds any of the pre-defined sensor thresholds at step 608. If the controlled system 104 determines that the sensor data does not exceed any pre-defined sensor thresholds, no further action is taken by the controlled system 104 with respect to the control mechanism 102 at step 610. If the controlled system 104 determines that the sensor data does exceed a pre-defined threshold, the controlled system 104 identifies the input data associated with that pre-defined threshold. The controlled system 104 issues an image generation command to generate image(s) responsive to the received input data for display at the control mechanism 102 at step 612. The controlled system 104 generates the image(s) in accordance with the image generation command at step 614 and transmits the generated image(s) to the control mechanism 102 for display in the display area 106 at step 616. In one embodiment, the image(s) displayed in the display area 106 reflects the status of the controlled system 104 responsive to the received input data. In one embodiment, the image(s) displayed in the display area 106 reflects the status of the controlled system 104 with respect to a parameter controlled by the control mechanism 102.

While the steps in the method 600 have been described in a particular order, the steps may be performed in a different order. A subset of the described steps or additional steps may be performed in addition to the described steps.

Figure 7:
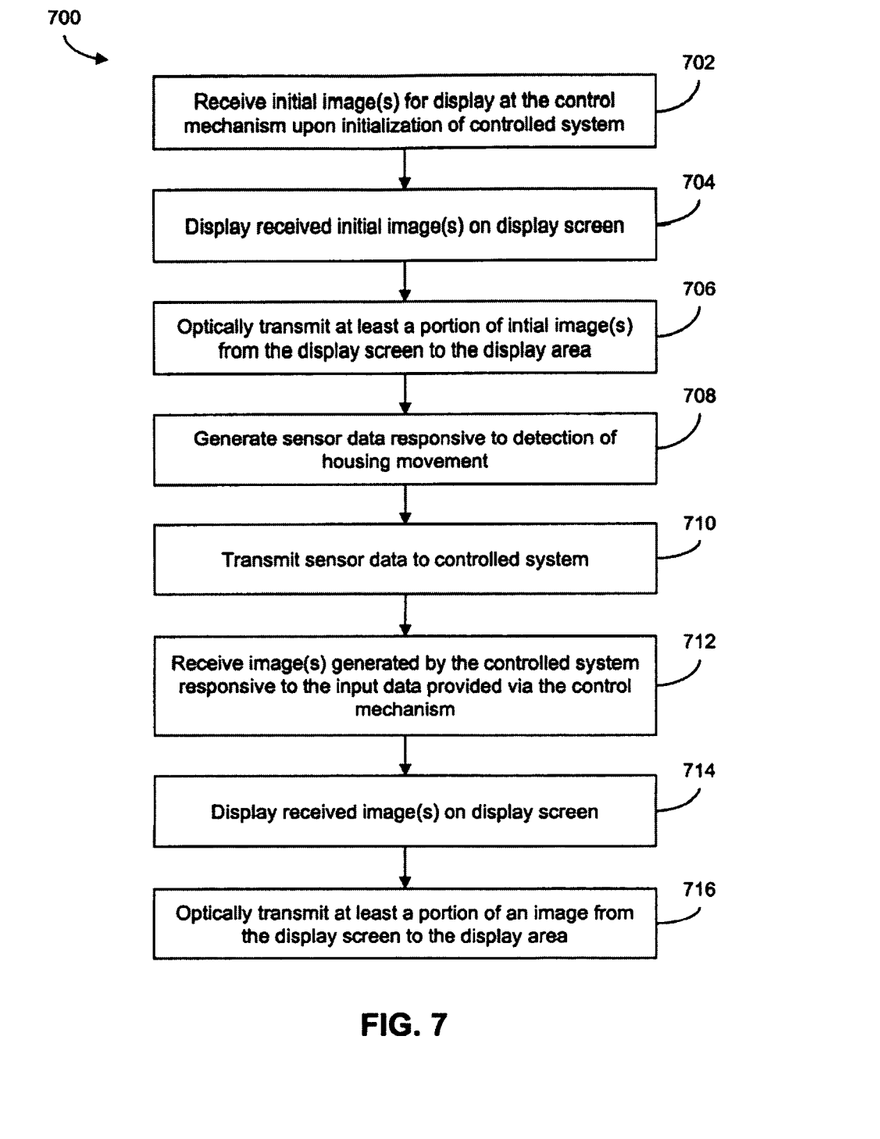
FIG. 7 is a flowchart representation of one embodiment of a method of displaying images in the display area of a control mechanism.

Referring to FIG. 7 a flowchart representation of one embodiment of a method 700 of displaying images in the display area 106 of a control mechanism 102 is shown. The control mechanism 102 receives the initial image(s) for display at the control mechanism 102 upon initialization of the controlled system 104 at step 702. The received initial image (s) is displayed on the display screen 306 at step 704. The optical coupling system 308 optically transmits at least a portion of the initial image(s) displayed on the display screen 306 to the display area 106 at step 706. In one embodiment, the display orientation of the initial image(s) on the display screen 306 is generally the same as the display orientation of the initial image(s) in the display area 106. In one embodiment, the initial image(s) displayed in the display area 106 reflects the initial status of the controlled system 104. In one embodiment, the initial image(s) displayed in the display area 106 reflects the initial status of the controlled system 104 with respect to a parameter controlled by the control mechanism 102.

When a user wishes to provide input data to the controlled system 104 via the control mechanism 102, the user manipulates the position of the housing 302 to provide the desired input data. The input sensor(s) 304 at the control mechanism 102 sense the movement of the housing 302. The input sensor(s) generate sensor data responsive to detection of housing movement at step 708 and transmits the sensor data to the controlled system 104 at step 710.

The controlled system 104 analyzes the received sensor data to determine whether a user provided input data to the controlled system 104. If the controlled system 104 determines that input data was provided to the controlled system 104 via the control mechanism 102, the controlled system 104 generates image(s) responsive to the received input data and transmits the generated image(s) to the control mechanism 102. The control mechanism 102 receives the image(s) generated by the controlled system 104 responsive to the input data provided via the control mechanism 102 at step 712. The received image(s) are displayed on the display screen 306 at step 714. The optical coupling system 308 optically transmits at least a portion of the image(s) displayed on the display screen 306 to the display area 106 at step 716. In one embodiment, the orientation of the image(s) on the display screen 306 is generally the same as the orientation of the image(s) in the display area 106. In one embodiment, the image(s) displayed in the display area 106 reflects the status of the controlled system 104. In one embodiment, the image(s) displayed in the display area 106 reflects the status of the controlled system 104 with respect to a parameter controlled by the control mechanism 102.

While the steps in the method 700 have been described in a particular order, the steps may be performed in a different order. A subset of the described steps or additional steps may be performed in addition to the described steps.

In one embodiment, a control mechanism 102 having an image display area 102 includes a housing 302, an input sensor 304, a display screen 306 and an optical coupling system 308. The housing 302 including a display area 106 and is moveable from a first position to a second position. The input sensor 304 is operable to detect movement of the housing 302 from the first position to the second position and to be communicatively coupled to a controller 202. The display screen 306 is operable to be communicatively coupled to the controller 202 and to display a first image generated by the controller 202 responsive to detection of movement of the housing 302 from the first position to the second position by the input sensor 304. The optical coupling system 308 is operable to optically couple an area of the display screen 306 to the display area 106 and to optically transmit at least a portion of the first image displayed on the display screen 306 for display in the display area 106 of the housing 302.

In one embodiment, a control mechanism 102 having an image display area includes a housing 302, an input sensor 304, and a display screen 306. The housing 302 comprises a fiber optic material and includes a display area 106. The housing 302 is moveable from a first position to a second position. The input sensor 304 is operable to detect movement of the housing 302 from the first position to the second position and to be communicatively coupled to a controller 202. The display screen 306 is operable to be communicatively coupled to the controller 202 and to display a first image generated by the controller 202 responsive to detection of movement of the housing 302 from the first position to the second position by the input sensor 304. The fiber optic material operates as an optical coupling system 308 and operates to optically transmit at least a portion of the first image displayed on an area of the display screen 306 for display on the display area 106 of the housing 302.

In one embodiment a computer readable medium 206 stores a computer executable program for displaying an image in a control mechanism 102 having an image display area 106. The computer readable medium 206 includes computer readable code for receiving control mechanism housing movement data from an input sensor 304 operable to detect movement of a control mechanism housing 302, the control mechanism 102 housing having a display area 106, computer readable code for determining whether the detected movement of the control mechanism housing 302 is from a first position to a second position; and computer readable code for generating a first image for display on a display screen 306 based on the determination, wherein at least a portion of the first image is optically transmitted via an optical coupling system 308 from a first area of the display screen 306 for display in the display area 106 of the control mechanism housing 302.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A control mechanism having an image display area comprising:
   a housing including a display area, the housing being moveable from a first position to a second position;
   an input sensor operable to detect movement of the housing relative to a display screen and to be communicatively coupled to a controller;
   the display screen operable to be communicatively coupled to the controller and to display a first image generated by the controller responsive to detection of movement of the housing from the first position to the second position by the input sensor; and
   an optical coupling system operable to optically couple an area of the display screen to the display area and to optically transmit at least a portion of the first image displayed on the display screen for display in the display area of the housing;
   wherein the display screen is operable to display a second image generated by the controller prior to detection of the movement of the housing from the first position to the second position, the optical coupling system is operable to optically transmit at least a portion of the second image displayed on the display screen for display in the display area, and the first image differs from the second image.

2. The control mechanism of claim 1, wherein the display screen is maintained in a fixed position independent of movement of the housing.

3. The control mechanism of claim 1, wherein the input sensor is operable to detect movement of the housing selected from a group consisting of a rotational movement about a rotation axis, a translational movement in a plane and a vertical movement along a vertical axis.

4. The control mechanism of claim 1, further including a bias system operable to bias the position of the housing towards the first position.

5. The control mechanism of claim 1, wherein the second position is a relative position with respect to the first position.

6. The control mechanism of claim 1, wherein the input sensor is selected from a group consisting of a pressure sensor, an optical sensor, a magnetic sensor and a position encoder.

7. The control mechanism of claim 1, wherein the display screen is selected from a group consisting of an electroluminescent display screen, a LED screen and an OLED screen.

8. The control mechanism of claim 1, wherein the optical coupling system is selected from a group consisting of a fiber optic system and a rear projection system.

9. The control mechanism of claim 1, wherein the display screen has a first shape and the display area has a second shape, the first shape being different from the second shape.

10. The control mechanism of claim 1, wherein the area of the display screen has a first shape and the display area has a second shape, the first shape being different from the second shape.

11. The control mechanism of claim 1, wherein the display screen has a first size and the display area has a second size.

12. The control mechanism of claim 1, wherein the display area is selected from a group consisting of a portion an outer surface of the housing, an entire outer surface of the housing, a portion of an upper surface of the housing and an entire upper surface of the housing.

13. The control mechanism of claim 1, wherein the first image displayed on the display screen has a display orientation and the optical coupling system is operable to optically transmit at least a portion of the first image from the display screen to the display area for display in the display orientation.

14. A control mechanism having an image display area comprising:
   a housing comprising a fiber optic material and including a display area, the housing being moveable from a first position to a second position;
   an input sensor operable to detect movement of the housing relative to a display screen and to be communicatively coupled to a controller; and
   the display screen operable to be communicatively coupled to the controller and to display a first image generated by the controller responsive to detection of movement of the housing from the first position to the second position by the input sensor, wherein the fiber optic material operates as an optical coupling system and operates to transmit at least a portion of the first image displayed on an area of the display screen for display in the display area of the housing;
   wherein the display screen is operable to display a second image generated by the controller prior to detection of movement of the housing from the first position to the second position, the optical coupling system is operable to optically transmit at least a portion of the second image on the display screen for display in the display area, and the first image differs from the second image.

15. The control mechanism of claim 14, wherein the display screen is maintained in a fixed position independent of movement of the housing.

16. The control mechanism of claim 14, wherein the input sensor is operable to detect movement of the housing selected from a group consisting of a rotational movement about a rotation axis, a translational movement in a plane and a vertical movement along a vertical axis.

17. The control mechanism of claim 14, further including a bias system operable to bias the position of the housing towards the first position.

18. The control mechanism of claim 14, wherein the second position is a relative position with respect to the first position.

19. The control mechanism of claim 14, wherein the input sensor is selected from a group consisting of a pressure sensor, an optical sensor, a magnetic sensor and a position encoder.

20. The control mechanism of claim 14, wherein the display screen is selected from a group consisting of an electroluminescent display screen, a LED screen and an OLED screen.

21. The control mechanism of claim 14, wherein the display screen has a first shape and the display area has a second shape, the first shape being different from the second shape.

22. A non-transitory computer readable medium for storing a computer executable program for displaying an image in a control mechanism having an image display area, the computer readable medium comprising:
- computer readable code for receiving control mechanism housing movement data from an input sensor operable to detect movement of a control mechanism housing relative to a display screen, the control mechanism housing having a display area;
- computer readable code for determining whether the detected movement of the control mechanism housing is from a first position to a second position;
- computer readable code for generating a first image for display on the display screen based on the determination, wherein at least a portion of the first image is optically transmitted from an area of the display screen to the display area of the control mechanism housing via an optical coupling system for display in the display area of the control mechanism housing subsequent to the determination; and
- computer readable code for generating a second image for display on the display screen prior to the determination, wherein at least a portion of the second image is optically transmitted from the area of the display screen to the display area of the control mechanism housing via the optical coupling system for display in the display area of the control mechanism housing prior to the determination.

* * * * *